(12) United States Patent
Beaujean et al.

(10) Patent No.: US 7,773,513 B2
(45) Date of Patent: Aug. 10, 2010

(54) ADMISSION CONTROL FOR A HETEROGENEOUS COMMUNICATION SYSTEM

(75) Inventors: Christophe Beaujean, Arpajon (FR); Pierre Roux, Argenteuil (FR)

(73) Assignee: Motorola, Inc., Schaumburg, IL (US)

( * ) Notice: Subject to any disclaimer, the term of this patent is extended or adjusted under 35 U.S.C. 154(b) by 31 days.

(21) Appl. No.: 12/261,083

(22) Filed: Oct. 30, 2008

(65) Prior Publication Data

US 2010/0110887 A1    May 6, 2010

(51) Int. Cl.
*H04L 12/26* (2006.01)
(52) U.S. Cl. ...................................... 370/230; 370/235
(58) Field of Classification Search ......... 370/229–235, 370/252–253, 400–411
See application file for complete search history.

(56) References Cited

U.S. PATENT DOCUMENTS

| | | | |
|---|---|---|---|
| 6,745,286 B2 * | 6/2004 | Staub et al. ................. | 711/114 |
| 6,970,422 B1 | 11/2005 | Ho et al. | |
| 6,987,729 B1 * | 1/2006 | Gopalakrishnan et al. ... | 370/230 |
| 7,068,607 B2 | 6/2006 | Partain et al. | |
| 7,092,356 B2 | 8/2006 | Rabie et al. | |
| 7,269,423 B2 | 9/2007 | Lee et al. | |
| 7,269,657 B1 | 9/2007 | Alexander et al. | |
| 7,315,514 B2 * | 1/2008 | Heiner et al. ................ | 370/230 |
| 2005/0163103 A1 * | 7/2005 | Malomsoky et al. ........ | 370/352 |
| 2005/0195741 A1 | 9/2005 | Doshi et al. | |
| 2007/0165536 A1 | 7/2007 | Lee et al. | |
| 2007/0230335 A1 | 10/2007 | Sang et al. | |
| 2007/0286092 A1 | 12/2007 | Famolari et al. | |
| 2008/0049648 A1 | 2/2008 | Liu et al. | |
| 2008/0049776 A1 | 2/2008 | Wiley et al. | |

FOREIGN PATENT DOCUMENTS

WO    2007063413 A2    6/2007

OTHER PUBLICATIONS

Levine, David A. et al.: "A Resource Estimation and Call admission Algorithm for Wireless Multimedia Networks Using the Shadow Cluster Concept", IEEE/ACM Transactions on Networking, vol. 5, No. 1, Feb. 1997, 1063-6692/97, pp. 1-12.
Sherif, Mahmoud R. et al.: "Adaptive Allocation of Resources and Call Admission Control for Wireless ATM Using Genetic Algorithms", IEEE Journal on Selected Areas in Communications, vol. 18, No. 2, Feb. 2000, 0733-8716/00, pp. 268-282.

(Continued)

*Primary Examiner*—Phuc Tran

(57) ABSTRACT

A heterogeneous communication system comprises a plurality of heterogeneous access networks and a core network connecting the heterogeneous access networks. An admission server of the core network receives resource indications indicative of an estimated resource usage for a given communication service and a given access point of an access network. The admission server furthermore determines and stores current resource availability indications for access points. When a communication session request comprising a communication service indication and an access point identification is received, the admission server determines an estimated resource requirement for the communication sessions based on the resource indications. The admission server then determines whether to allow the communication session dependent on the resource availability for the access point and the estimated resource requirement for the communication service.

20 Claims, 3 Drawing Sheets

OTHER PUBLICATIONS

Daher, Robil et al.: "Resource Reservation and Admission Control in IEEE 802.11 WLANs", QShine '06, ACM Proceedings of the 3rd International Conference on Quality of Service in Heterogeneous Wired/Wireless Networks, Waterloo, Ontario, Canada, Aug. 7-9, 2006, pp. 1-7.

Zhang, Fengxia et al.: "Delay-loss Based Endpoint Admission Control in Wireless Networks", Autumn 2003 DePaul CTI Research Symposium, Chicago, USA, Nov. 2003, pp. 1-5.

Janevski, Toni et al.: "Admission Control for QoS Provisioning in Wireless IP Networks", Spring 2003, www.mnlab.cs.depaul.edu/seminar/spr2003/WiQoS.pdf, pp. 1-7.

* cited by examiner

ADMISSION CONTROL FOR A HETEROGENEOUS COMMUNICATION SYSTEM

FIELD OF THE INVENTION

The invention relates to admission control for a heterogeneous communication system and in particular, but not exclusively, to admission control for a communication system comprising a plurality of heterogeneous radio access networks.

BACKGROUND OF THE INVENTION

An increasing number of communication systems have been developed and standardized to support various communication servers and usage scenarios. For example, cellular mobile communication systems such as the Global System for Mobile communication (GSM) or the Universal System for Mobile Telecommunication (UMTS) have been widely deployed. In addition, a large number of standards for wireless networks have been developed including the Institute for Electrical and Electronic Engineers IEEE 802.11 series of standards developed for unregulated deployment with relatively small coverage areas for each access point or the IEEE 802.16 standards developed for regulated deployment with relatively large coverage areas for each access point.

Increasingly there is a desire for different types of networks and systems to be integrated. In particular, it has been proposed that heterogeneous communication systems may be deployed which incorporate a number of different access networks interconnected by a core network. Such heterogeneous communication systems may provide an improved user experience and service and may for example provide seamless handovers wherein a communication session may seamlessly be transferred between different access networks without user involvement or indeed without the user being aware of the handover.

However, a critical parameter for communication systems is the allocation and utilization of available resource. Conventionally, the access resource, such as the air interface resource for a wireless access network, is managed and controlled by the individual access network. However, for heterogeneous communication systems, this may result in increased complexity of the individual access network and a suboptimal interworking and resource sharing between the different access networks. Also, in many systems centralized operations are required to manage e.g. subscription related issues such as user authorization, billing and admission control.

Accordingly, it may be advantageous to perform resource and admission control centrally. However, providing a common centralized resource management approach is associated with a large number of problems and difficulties. In particular, in order to improve resource utilization, the admission of a new communication service should take into account the specific characteristics of the access network(s) that supports the communication service. However, this typically results in increased complexity and increased signaling overhead.

Hence, an improved approach for a heterogeneous communication system would be advantageous and in particular a system allowing reduced signaling, reduced complexity, increased reliability and/or improved admission control would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a heterogeneous communication system in accordance with claim 1.

The invention may allow improved and/or facilitated admission control for a heterogeneous communication system. In many embodiments and scenarios, an improved admission control and thus resource utilization may be achieved which takes into account specific characteristics of individual access networks. Furthermore, a centralized and common admission control may be achieved with reduced complexity.

The approach may in many scenarios provide a centralized admission control which is based on an improved accuracy of resource characteristics of the individual access networks while maintaining low complexity and low signaling overhead.

According to another aspect of the invention there is provided a method in accordance with claim 20.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
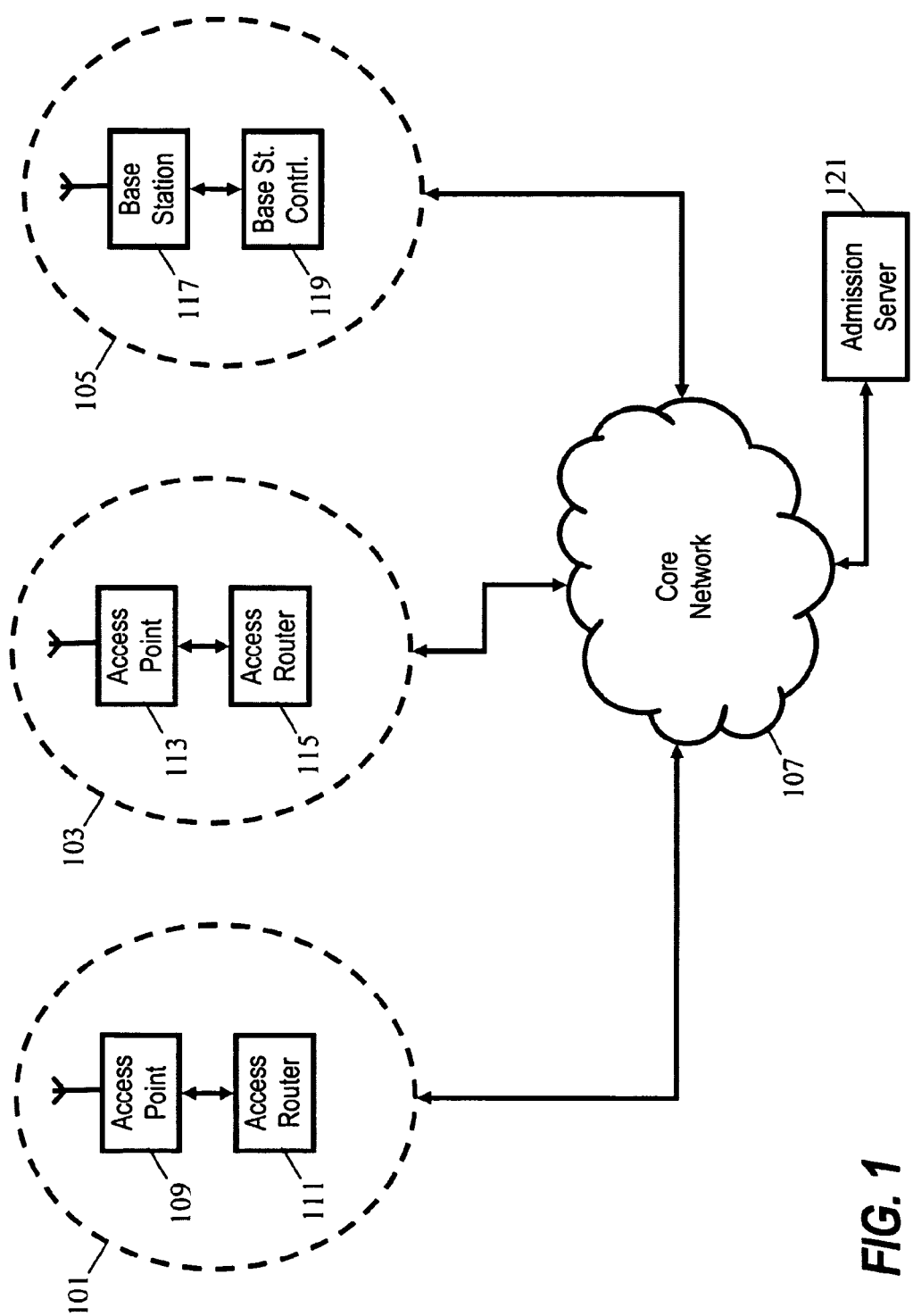
FIG. 1 illustrates an example of a heterogeneous communication system in accordance with some embodiments of the invention.

FIG. 1 illustrates an example of a heterogeneous communication system. The communication system comprises a number of access networks which can be used by subscriber units to access the communication system. The access networks are heterogeneous and each access network may provide access independently of the other heterogeneous access networks. At least some of the access networks use different access technologies. For example, one (or more) of the access network may be a Wireless Local Area Network (WLAN), another access network may be a wired access network, another access network may be a Wireless Metropolitan Area Network (WMAN), another access network may be a mobile cellular access network. Thus, different access networks of the number of heterogeneous access networks may support a subscriber unit in accordance with different and independent standards and technical specifications.

FIG. 1 illustrates three access networks 101-105 but it will be appreciated that there may be more (or less) access networks in other embodiments.

Furthermore, in the specific example, all three access networks 101-105 use different technologies and operate in accordance with different standards. However, it will be appreciated that two or more access networks may use the same access technology in some embodiments.

In the specific example, the first access network 101 is a wireless local area network and specifically is an IEEE 802.11 wireless local area network, such as a WiFi™ network. The second network 103 is a wireless medium area network which specifically is an IEEE 802.16e network, such as a WiMAX™ network. Furthermore, the third network 105 is a cellular mobile communication system which in the specific example is a UMTS system.

The access networks 101-105 are coupled together by a core network 107 which in the specific example is an Internet Protocol (IP) based network. The core network 107 provides an interface between the access networks 101-105 and allows data communications between the access networks 101-105 to be supported. The core network 107 also comprises various centralized operations and management functions including billing and authentication functions. Furthermore, the core network 107 provides a gateway to other communication systems, such as specifically a gateway to the Internet.

Each of the access networks provides a number of points of access to the communication system for a subscriber unit. Such access points may for example be wireless access points, such as a WLAN or WMAN access point, a base station, a wired access point (e.g. for a wired Ethernet connection) or any other function or entity supporting a subscriber unit communication session that uses the heterogeneous communication system. In the following, the term access point will be used to denote any entity allowing a subscriber unit to access the communication network, including base stations and wired access points.

Typically, each access network will comprise a large number of access points that are coupled together by other network elements, such as access routers, base station controllers, radio network controllers etc in accordance with the Standards and Technical Specifications for the individual access network.

For clarity, FIG. 1 illustrates a single access point 109 and a single access router 111 for the first access network 101, a single access point 113 and a single access router 115 for the second access network 103, and a single base station 117 and a single base station controller 119 for the third access network 105.

A subscriber unit may access the communication system using any access point with which the subscriber unit has functionality for communicating with and is authorized to use. For example, a subscriber unit can be a multimode subscriber unit capable of communicating both in accordance with the IEEE 802.11b/n standards, the IEEE 802.16e standard and the UMTS standard. Such a subscriber unit may access the communication system using any of the access networks. Furthermore, as a subscriber unit moves within the communication system communication sessions may be handed over from one access network to another.

In order to ensure that the communication system is efficiently utilized, it is important that the available resource is effectively managed and that the admission of subscriber units and communication sessions to the communication system is effectively controlled. In the system of FIG. 1, the admission of communication sessions to the communication system (i.e. whether the communication sessions are allowed to be setup) is centrally controlled by an admission server 121. It will be appreciated that for clarity the admission server 121 is illustrated as connected to the core network 107 but that it may be considered to be part of the core network 107 itself.

In the system, communication session set up for all of the heterogeneous access networks is controlled by the admission server 121. Whenever a subscriber unit initiates a communication session, a communication session setup request is transmitted to the admission server 121 which in response proceeds to determine whether this communication session may be admitted or whether it should be rejected. The admission server 121 first evaluates whether the subscriber unit is indeed authorized to be provided with the requested communication service. Specifically, the admission server 121 can access a centralized user profile store to retrieve the user profile for the user identity which is associated with the subscriber unit. If the user profile indicates that the subscriber unit is authorized to be supported by the requested communication service, the admission server 121 proceeds to evaluate whether the requested communication session can be supported within the current resource constraints. The admission server 107 estimates the required and available resource usage for the specific access network and access point supporting the subscriber unit as will be described later. It then proceeds to either reject or allow the communication session request. If the request is allowed, the access network proceeds to setup the communication session.

The admission server specifically considers access point resource and, in the following, references to resource are specifically references to access point resource. The access point resource is a resource which is limited for each individual access point and is used by a subscriber unit accessing the system through the access point. Specifically, the access point resource may be an air interface resource for a wireless access network or a wired connection resource for a wired access network (such as a wired Ethernet access point).

In the system, the admission server 121 is arranged to perform admission control and thus to determine whether a specific communication session is to be set up or not. However, the admission server 121 does not itself allocate the specific resource required. Rather, the required resource is allocated by the individual access network in accordance with the standards and procedures that are applicable to the specific access network. For some access networks, such as IEEE 802.11, the access point communication resource is not controlled by the access network but rather the subscriber unit is served according to a best effort policy.

The system of FIG. 1 uses a new centralized admission control system which is based on a realistic resource management solution that can be adapted to any kind of access technology.

In the system, network elements at the edge of each access network are requested to deliver accurate information about the real resource consumption of the different communication sessions/services. The admission server 121 then uses this information to decide whether to admit or refuse new communication sessions. The resource information may be derived from both resource usage monitoring (on a per-session basis) and e.g. radio signal strength measurements. Depending on the precision of the measurements and the frequency of the information collection, the admission server 121 is then able to maintain a more or less precise and realistic view of the available resources in the different heterogeneous access networks.

In the system, the resource information used by the admission server 121 is independent of the specific characteristics of the different technologies used by the different access networks. In particular, the available resources for each access point in the system are stored in a common format and database structure. Accordingly, the resource information is used similarly regardless of the access network and access technology. Also, the resource information provided by the network elements of the access networks is provided in a common format which is independent of the underlying technology characteristics. In the system, the access points may comprise resource consumption modules that provide technology independent resource information. The resource consumption modules are designed for the individual access network such that they can determine access network independent resource information which however is derived from the specific characteristics of the specific communication system. Thus, each of the resource consumption modules comprises information defining how to translate specific access network dependent resource consumption data into generic information for the admission server 121.

The system provides for an accurate and reliable centralized admission control for a number of heterogeneous access networks while hiding the specific and individual characteristics of the access link from the admission server 121. Thus, a substantially reduced complexity of the centralized admission control can be achieved.

Figure 2:
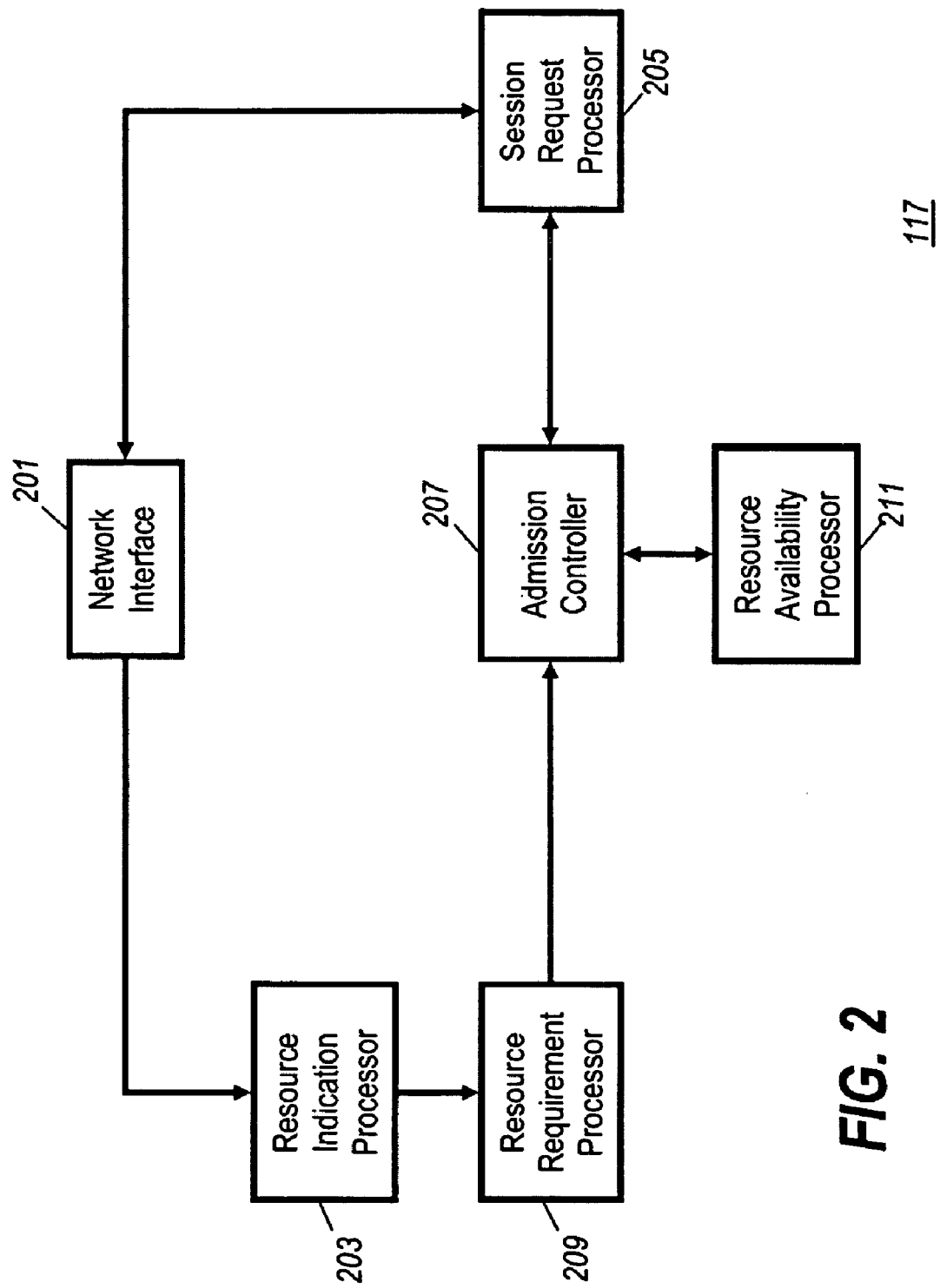
FIG. 2 illustrates an example of an admission server for a heterogeneous communication system in accordance with some embodiments of the invention.

FIG. 2 illustrates the admission server 121 in more detail. The admission server comprises a network interface 201 which interfaces the admission server 121 to the core network 107.

The network interface 201 is coupled to a resource indication processor 203 which is arranged to receive resource usage data from the heterogeneous access networks 101-105. The resource usage data comprises resource indications which are indicative of an estimated resource usage for a given communication service and a given access point.

Specifically, network elements of the individual access networks can determine resource usage estimates for an individual access point for each of the communication services that can be supported by that access point. For example, a specific access point can determine the resource required to support a communication service with a first set of Quality of Service (QoS) parameters, for a communication service with a second set of QoS parameters, etc. The resource usage which is typically used to support a specific communication service is thus determined, for example by monitoring previous communication sessions for this communication service (a communication session may be considered a specific instantiation of a communication service, i.e. a communication service may be considered a set of QoS parameters which may be applied or guaranteed for a communication session that belongs to this communication service). The access point can then transmit a resource indication to the admission server 121 indicating the estimated resource. When the admission server 121 subsequently receives a communication session setup request for a communication session of this communication service type and to be supported by this access point, it proceeds to use this resource indication as an estimate for the resource that will be consumed by the communication session if it is admitted.

It will be appreciated that the resource which is required by a specific communication service (or class of services) may depend on many things including, for a wireless access network, the propagation conditions, the interference level, the modulation scheme used, the specific resource scheduling algorithm, etc. Thus, the actual resource is heavily dependent on specific characteristics of the access technology used by the access network as well as on the specific conditions the individual subscriber unit and access point experiences.

However, in the system, the resource indication that is provided for a given access point is technology independent and independent of the specific conditions experienced. Thus, a common format is used for all access networks.

As a specific example, the resource indications may simply indicate the estimated resource usage for a given communication service and a given access point as an estimated proportion of the total available resource that is required to support such a service. For example, for communication service X and access point Y, the resource indication may simply indicate a percentage of the total capacity (i.e. the total available resource) of access point Y that a communication session of communication service type X will use if admitted. Thus, a simple percentage value may be indicated for each service type and each access point.

In the arrangement of FIG. 1, the generic resource indications are calculated in the individual access points and take into account access network specific characteristics and operating conditions. For example, the access point may simply measure the resource used by communication sessions for a given communication service and then average these. Thus, the relative proportion of the total resource that is required by each communication service can be determined with a relatively high accuracy. However, at the same time, the admission server 121 may use such accurate data while not having to consider any specific characteristics of the specific access network or of the individual base station. Thus, an accurate, reliable yet low complexity operation can be achieved. Furthermore, the amount of data that is communicated to the admission server 121 may be reduced thereby reducing the signalling overhead of the approach.

As a specific example, an IEEE 802.16 access point may be able to support a total throughput of 5 Mbit/s in ideal operating conditions. However, due to interference from other systems etc., the real capacity for a specific access point may be substantially lower. The access point may measure that communication sessions for a video stream communication service requiring a 300 kbits/s rate on average consumes 6% of the resources of the access point. Accordingly, the access point may transmit a resource indication to the admission server 121 indicating that for this specific access point, a communication session for this service (i.e. having these specific QoS requirements) will consume 4.3% of the available resource. Thus, a highly accurate resource indication taking into account the specific conditions and technologies is provided to the admission server 121 in a format which enables a low complexity admission control.

In the system of FIG. 1, the resource indications provided to the admission server 121 use a common format for all of the heterogeneous access networks. Furthermore, although the resource estimates themselves may depend on the specific characteristics of the access technology, the resource indications are technology independent. Specifically, the estimated resource usage for a given access point and a given communication service is given as an estimated fraction of a total resource availability of the access point required by the communication service. Thus, the estimated resource usage is presented as a simple relative resource value which indicates the relative amount of the total resource capacity of the access point that is estimated to be required for the specific service and the specific base station.

The network element which transmits resource indications to the admission server 121 for a specific access point may be different in different embodiments and in different access networks. The resource indications may be generated and transmitted to the admission server 121 by the access point itself. For example, in the example of FIG. 1, resource indications for the IEEE 802.11 access point 109 may be provided from the access point 109 itself. Similarly, the IEEE 802.16 access point 113 may itself generate resource indications and transmit them to the admission server 121. For the cellular communication system 105, the base station 117 may itself estimate the average resource usage for different communication services and transmit an indication thereof to the admission server 121. Alternatively or additionally, the resource indications may be generated by other access network elements. For example, for a cellular communication system, the air interface resource is partly controlled by a base station controller (such as a GSM Base Station Controller or a UMTS Radio Network Controller). In some embodiments, the resource indications may accordingly be generated and transmitted by such base station controllers. Similarly, for wireless networks, the resource indications may be generated and transmitted to the admission server 121 by an access router supporting one or more access points.

The admission server 121 furthermore comprises a session request processor 205 coupled to the network interface 201. The session request processor 205 is arranged to receive communication session setup requests for user equipments that are seeking to set up a communication session using the heterogeneous communication system. Thus, whenever a subscriber unit intends to initialise the new data communication, a communication session setup request is first transmitted to the admission server 121 and fed to the session request processor 205. For example, if a subscriber unit initiates a video communication session with another subscriber unit, the session request processor 205 receives a request to set up this communication session (depending on the embodiment and the specific access network characteristics, the session request may be initiated by the subscriber unit itself or by a network element of the access network supporting the subscriber unit).

The communication session setup request comprises a communication service indication identifying the service of the communication being set up. Specifically, the indication can define the desired QoS characteristics either explicitly or indirectly by identifying a specific predefined service having predefined QoS characteristics/requirements. The session request furthermore comprises an access point identification which identifies the specific access point which is currently supporting the user equipment, i.e. the access point that was used for setting up the session and at least initially supporting the service.

The session request processor 205 is coupled to an admission controller 207 which is arranged to control admission of communication sessions to the heterogeneous communication system. Specifically, for each received communication session request, the admission controller 207 proceeds to determine whether the communication session is admitted or refused. The decision of whether to admit or refuse a specific communication session is based on an assessment of the access point resource required to support the communication session and the available resource at the access point (assuming that a previous authorisation of the subscriber unit has been successful).

The admission server 121 also comprises a resource requirement processor 209 which is coupled to the resource indication processor 203 and to the admission controller 207.

Based on the resource indications received from the access networks, the resource requirement processor 209 determines an estimated resource usage for all valid combinations of access points and communication services. Specifically, for each communication service supported by a given access point, the resource requirement processor 209 stores an estimated resource requirement given as a percentage of the total available resource of the base station. Thus, the resource requirement processor 209 maintains a table linking access point identifiers and communication service identifiers to resource requirement. This information is stored in a common format which is independent of the characteristics and conditions of the specific access network. Rather, a simple generic value is used. However, as this value is based on individual evaluations in the individual access networks, it provides an accurate indication of the resource which is likely to be consumed by the service.

Furthermore, the estimated resource requirements are stored using a format which is common for all access networks. Thus, although the estimated resource requirements are originally determined in the individual access networks based on the specifics of the access network, the stored values are technology independent.

It will also be appreciated that a base station may use several carriers and several sectors. In such cases, each carrier and sector combination may for example be handled individually as an individual resource. Thus, rather than a per cell resource evaluation, a per sector and/or per carrier resource evaluation may be applied.

When the admission controller 207 receives a communication session request it accesses the resource requirement processor 209 which proceeds to retrieve the estimated resource requirement stored for the specific access point identifier and communication service identifier contained in the session request. The resulting estimated resource requirement is then fed to the admission controller 207.

The admission server 121 also comprises a resource availability processor 211 which is coupled to the admission controller 207. The resource availability processor 211 maintains a record of the currently available resource for each access point of each access network. As a low complexity example, the resource availability processor 211 may simply store a value indicating the percentage of the total available resource of an access point which is currently estimated to be used by communication sessions that have previously been admitted. For example, if five communication sessions are currently active for a specific access point and if these have been estimated to require respectively 1, 3, 3, 6 and 8% of the capacity of an access point, then the resource availability processor 211 may simply store a value indicating that currently 21% of the total available resource of the access point is used.

Thus, in the admission server 121 of FIG. 2, the stored current resource availability indications use a common format for all of the heterogeneous access networks. Furthermore, this format is technology independent.

When the admission controller 207 receives a communication request for a specific communication service it accesses the resource availability processor 211 to retrieve the currently stored resource availability value for the access point identified by the access point indicator of the session request. The admission controller 207 then proceeds to evaluate the estimated resource requirement provided by the resource requirement processor 209 relative to the currently available resource provided by the resource availability processor 211. Based on this evaluation, the admission controller 207 proceeds to make a decision of whether the communication session is admitted or refused.

As a low complexity example, the admission controller 207 may simply compare the estimated resource requirement to the currently available resource. If the currently available resource exceeds the estimated resource requirement by a sufficient margin, the admission controller 207 may proceed to admit the communication session and otherwise it is refused. The decision is fed to the session request processor 205 which proceeds to generate a session request response which indicates whether the communication session has been admitted or refused. The response is then transmitted back to the subscriber unit.

If the communication session is admitted, the individual access network may proceed to allocate the required resource (for access networks wherein the access network is in charge of resource allocation). For systems such as IEEE 802.11 wherein the access point does not control access resource, the subscriber unit may simply proceed to setup the communication session and thus to use the necessary resource.

Furthermore, when a communication session is admitted, the estimated resource requirement for the communication session is fed to the resource availability processor 211. The resource availability processor 211 then proceeds to reduce the current resource availability indication which has been stored for the access point which is supporting the communication session. The amount of the reduction is based on the estimated resource requirement. As a low complexity example, the currently available resource for the access point may simply be reduced by an amount that corresponds to the estimated resource requirement (or equivalently an amount of used resource may be increased).

The admission server 117 further comprises storage (not shown), i.e. memory, for storing any of the stored information referenced herein and for storing processing rules for different categories of access networks, wherein the admission server is arranged to adapt admission control for a first access network in response to processing rules for a category to which the first access network belongs.

Specifically, an operator of the admission server may define a number of different access network categories with each category being defined by a set of characteristics that the access network must have in order to belong to the category. For each category, a set of processing rules may then specify how an access network belonging to the category should be treated. Thus, when e.g. a communication session setup request is received from an access network, the admission server may first identify the category to which the access network belongs. It may then retrieve the processing rules for that category and proceed to process the communication session setup request in accordance with these processing rules.

It will be appreciated that any definition or categorisation of access networks may be used. Specifically, the operator of the admission server may manually define a division of access networks into different categories (or groups). In the specific example described later, the categorisation or grouping is performed in dependence on whether access networks are designated as regulated or non-regulated access networks and whether they are designated as access network resource controlled network or as non-access network resource controlled networks. Thus, in this example, four categories of access networks are defined corresponding to:
1. access network resource controlled and regulated access networks;
2. access network resource controlled and non-regulated access networks;
3. non-access network resource controlled and regulated access networks; or
4. non-access network resource controlled and non-regulated access networks.

Thus, the approach may allow a low complexity centralised admission control operation which is independent of the specific technologies, characteristics and conditions of the individual access network. However, although the centralised admission control does not consider the specifics of the individual access network, the resulting admission control inherently and implicitly takes these factors into account by using estimated resource requirements determined in the access networks and providing accurate reflections of the actual resource requirements for the individual access networks. Thus, the approach provides an advantageous trade-off between reduced complexity and improved accuracy and performance. Furthermore, the approach allows an efficient centralised admission control while at the same time allowing the actual control and allocation of resource to be individually handled in the individual access networks.

In some embodiments, different access networks may not necessarily provide the same resource data to the admission server 121. For example, some access networks may provide dynamic data which is continuously updated based on measurements in the access network whereas other access networks may provide static predetermined data.

As an example, the access networks may be divided into different categories of access networks with the approach for generating the resource indications and the data comprised in the resource indications being different for the different categories.

In the specific example of FIG. 1, access networks may be designated to be either regulated or non-regulated access networks. Additionally or alternatively, the access networks may be designated to be either access network resource controlled network or non-access network resource controlled networks. The admission server 121 may then process the resource usage data dependent on the specific designation of the access networks which originate the resource usage data.

The designation of an access network as regulated or unregulated can reflect whether a minimum resource availability is guaranteed or not. Specifically, for a regulated network, the operation of each access point is protected by constraints to other systems co-existing with the heterogeneous communications such that the impact and interference from these other systems is guaranteed to be below a given level. Accordingly, the resource available for each access point can be assumed to predominantly be dependent on the characteristics of the access network itself and to a large extent to be independent of other systems, and in particular to be predominantly independent of interference caused by other systems. Accordingly, a minimum resource for the access network can be guaranteed.

In contrast, a non-regulated access network may not be protected against interference from other communication systems that may e.g. co-exist in the same area and frequency band as the access network. Accordingly, the resource that can be provided by the access network may heavily depend on the characteristics of the interfering systems. Accordingly, a minimum resource availability for the access network cannot be guaranteed.

A regulated a radio access network may be deployed in a regulated frequency band wherein the use of the frequency band is subject to regulations provided by regulation authorities. These regulations will ensure that external interference from other co-existing radio systems is kept low. If the radio access network is not subject to such regulation, it may be considered to be unregulated. For example, an IEEE 802.11b system is typically used as an unregulated technology while IEEE 802.16e systems may be both regulated and unregulated.

For a regulated access network, the resource requirement and usage may be effectively estimated based on considerations which take into account only the access network itself. However, for non-regulated access networks substantially improved performance can be achieved by also taking into account the impact of other systems.

An access network wherein the access resource is controlled by the access network will, in the following, also be referred to as a shaped access network as it provides the access network with the possibility of modifying and controlling ("shaping") the individual resource used by different communication services. Thus, such a system allows the access network to "shape" the traffic in the system. An access network wherein the access resource is not controlled by the access network will similarly be referred to as a non-shaped access network.

For example, an IEEE 802.16e access network can set up a specific communication session with specific QoS characteristics for an individual IP flow. Thus, the required QoS parameters may be provided and used to shape the traffic flows. In contrast, IEEE 802.11 access networks, such as WiFi™, are generally non-shaped access networks as they do not provide any kind of QoS guarantee, and the access network cannot control and shape individual communication sessions. For such systems, the individual subscriber unit may simply transmit and receive the required data without the access network being aware of the specific characteristics of the exchanged data (i.e. which session or service the data relates to).

A shaped access network is suitable for the resource estimation being determined at the access point based on the specific characteristics of the individual communication sessions. In particular, as the resource is controlled by the access network, the access network has the required information for determining the resource that is used by a specific session and thus associated with a specific service. However, for a non-shaped access network, the information of the resource used by the individual communication session is generally not known as the access network merely operates as a conduit for the communication session without controlling the resource or typically having any information of what data belongs to which data session or service.

The four possible combinations of these two categorisations of access networks will be individually considered in the following.

Regulated and Shaped Access Networks

For shaped access networks, such as IEEE 802.16e or UMTS access networks, the actual resource used for the individual communication session is known by the access network and typically the access point itself. Furthermore, if the access network is regulated, the impact from other co-existing systems is low and this may accordingly be ignored in the system.

In such access networks, the access point can be arranged to estimate the long term average resource ratio which is actually allocated for a given type of communication session, i.e. for the specific communication services (e.g. corresponding to a Class of Service (CoS)). Thus, the access point may contain a resource consumption entity which generates resource indications that define the average relative resource that is used for each specific communication service defined for the access point.

For example, on average, a service S1 requiring 100 kbits consumes 1.2% of the uplink radio resource of an IEEE 802.16e access point (this will generally depend on the selected modulation and the distance of the subscriber unit). The access point can then periodically report resource indications to the admission server 121 reflecting the currently experienced average resource ratio for the service S1 (i.e. if the resource usage increases from 1.2% to, say, 1.5%, the admission server 121 will be updated with this information).

The average resource ratio for the different communication services may be dynamically and continuously determined by the access point and reported to the admission server 121. The values can be averaged over all possible positions in the coverage area, and all possible usage ratios. However it is expected that once a given exploitation period is elapsed, the average resource levels will reach stable values. Thus, the admission server 121 may in this case assume that a new communication session for communication service S1 (i.e. 100 kbits) will need an effective resource share of 1.2% of the uplink resource of the access point.

For a regulated and shaped access network, the network elements (e.g. the access points) generate resource indications by monitoring the operational characteristics for the access points. These resource indications may be dynamically determined and transmitted to the admission server 121. The operational characteristic may specifically be a measured resource consumption for communication sessions of individual communication services.

Unregulated and Shaped Access Networks

In this scenario, the individual access points may still be able to determine the resource consumed by each communication session and service. Furthermore, this resource consumption may inherently reflect the impact of other communication systems, such as specifically the interference caused by these communication systems. Accordingly, the approach for unregulated and shaped access networks may be the same as for regulated and shaped access networks.

Regulated and Non-Shaped Access Networks

For access networks wherein the resource is not controlled by the access network but rather may be freely used by the subscriber units accessing the access point, the access network will typically not be able to determine which data is associated with each individual communication session and service. For example, a typical IEEE 802.11 access point merely provides an access to the communication system for a subscriber unit but does not itself contain any functionality for monitoring or controlling which communication sessions the individual data is associated with. Thus, as the access points do not include any per-session resource control mechanism, they are typically not able to determine the resource usage for individual services.

For such access networks, resource indications may be provided that include static predetermined resource indications. Thus, the resource indications may not be dynamically updated resource indications based on the measured operational characteristics but may rather be static and predetermined indications that have been derived by a dedicated measurement processes. For example, a manufacturer of an IEEE 802.11 access point may perform a number of experiments to determine the relative resource consumption for various communication services in various typical scenarios. These predetermined values may be stored in the access point and uploaded to the admission server 121. Thus, the resource estimates may be based on statistical data provided by the equipment manufacturer or collected by the operator.

Unregulated and Non-Shaped Access Networks

As for the regulated and non-shaped access networks, the unregulated and non-shaped access networks may upload static predetermined resource indications for different communication services based on data provided by manufacturers or operators.

For example, an IEEE 802.11b access network is a typical example of an access network using an unregulated and non-shaped technology. In such a system, the notion of service flow, communication session, communication service and resource allocation does not exist at the individual access point. Rather, all data flows/communication sessions are aggregated and share the same pool of access point resources without any differentiation or knowledge by the access point. Accordingly, it is not possible for the access point to measure the amount of available resources or the resource typically used for each individual communication service.

Therefore resource indications are transmitted to the admission server 121 based on resource consumption estimates that are derived from statistical information collected before the access point is brought into service. E.g., measurements may be made on the access point prior to it being brought into operation. Typically, only a single parameter, such as the average resource consumption, is determined for each communication service. Specifically, for each Class of Service and each level of QoS characteristics, the average resource consumption per communication session is determined based on experiments prior to the access point being enabled for general uses. For example, the average resource consumption for a service S1 having QoS parameters of a data rate of 100 kbits/s, a maximum latency of 1000 ms, an a maximum error rate of $10^{-6}$ may for an IEEE 802.11b access point be measured to be 1% of the total available resource.

These measurements are performed in a quasi perfect environment, i.e. in ideal conditions and in the absence of external interference etc. Thus, the static resource estimates represent the resource consumption if no external interference is present.

However, for an unregulated access network, the interference caused by other communication systems may vary very substantially and may be highly significant. In some embodiments, an unregulated and shaped access network may accordingly be arranged to transmit a dynamic resource correction value to the admission server. The dynamic resource correction value may reflect dynamic changes in the conditions experienced by the access point and affecting the resource consumption. The admission server 121 can then proceed to compensate the static predetermined resource indications received from the access point depending on the dynamic resource correction value.

The correction value may specifically indicate an interference level which is experienced by the access point. Thus, if an access point monitors a high level of interference, a correction value may be generated and transmitted to the admission server 121. The admission server 121 can then increase the stored static resource consumption values to reflect that the total available capacity for the access point is reduced by the interference.

The interference level may specifically be a level of interference which is created by interference sources that are external to the access network. Thus, the interference level may specifically reflect the interference that is caused by other co-existing communication systems sharing the unregulated spectrum. This, interference level can e.g. be measured by powering down access points and subscriber units during a short time interval in which the interference level is measured.

As a specific example, the static average resource estimate may be weighted by a correction value $\alpha$ which is periodically evaluated and reported to the admission server 121. In this scenario, $\alpha$ can equal to one if there is no external interference and can increase for increasing levels of the external interference. The resulting resource estimate may then simply be calculated by multiplying the static resource estimate by $\alpha$.

In the example, the access point is responsible for evaluating and communicating a to the admission server 121. The access point can periodically force all subscriber units to enter a power saving state for a short period (e.g. 20 ms). During this period, the access point(s) and the subscriber units do not transmit. The access point can then proceed to measure the received signal level which will provide a reliable measure of the interference from external sources experienced by the access point. The value of $\alpha$ may then be set depending on the interference level. The relationship between interference signal level and a may for example be derived from experiments and stored in a look-up table.

In some embodiments, a dynamic correction value (e.g. $\alpha$) is only provided for access networks that are non-shaped and non-regulated. Thus, the admission server 121 may only modify the stored resource estimates by a dynamic correction value for access networks that are designated as being non access network resource controlled and non-regulated.

In some embodiments, some access networks may use resource from a plurality of resource pools which may be completely independent of each other whereas other access networks may only use resource from a single resource pool.

For example, for an IEEE 802.11b network, the same resource pool is used for both communications to and from the subscriber unit. Thus, for such an access network, uplink (from subscriber unit to access point) and downlink (from access point to subscriber unit) resource usage is from the same resource pool. In contrast, for IEEE 802.16e or cellular mobile access networks, the uplink and downlink are separated into completely different frequency bands and accordingly the resource for uplink and downlink communications are taken from completely separate resource pools.

In such a system, the admission server 121 can be arranged to perform admission control dependent on whether the access network is a multi-resource pool access network or single resource pool access network.

For example, for an access network using separate uplink and downlink resource pools, an estimated resource usage for a given communication service may be a composite value comprising both an indication of an estimated uplink resource requirement and an estimated downlink resource requirement. Thus, an access points may transmit a resource indication which indicates that for a communication service S the estimated average resource usage is X % of the total available uplink resource and Y % of the total available downlink resource. In contrast, only a single resource estimate is provided for an access network relying on only a single resource pool.

The admission control may specifically require that for a multi-resource pool, there must be sufficient available resource from all resource pools. Thus, admission will be allowed only if each resource pool has an amount of available resource that is sufficient to support an estimated resource usage for the communication session for which setup is requested. In such an example, the admission server 121 may thus store individual current resource availability data for each resource pool. Specifically, for an IEEE 802.11e or cellular access network, the admission server 121 may store a current available uplink resource value and a current available downlink resource value, and a communication session will only be admitted if both the estimated uplink and downlink resource requirements for the communication service are less than the available uplink ad downlink resources.

In some embodiments, the admission server may store processing rules for different categories of access networks and the admission control may be adapted in accordance with the specific rules for the specific access network.

Specifically, the data contained in a resource indication may depend on the category of the access network. The resource indication may be provided in a message which comprises the following information:
- An access network identifier,
- An access point identifier,
- A list of services with an associated estimated resource requirement which for a shaped access network is a dynamic value based on measurements of the operating characteristics and for a non-shaped technology is a predetermined static value.
- A dynamic correction value (if the access network is an unregulated and non-shaped access network).

Whenever a new dynamic correction value is received, the resource requirement processor 209 proceeds to determine new resource requirement estimates for the services of the access point.

The processing rules which are stored in the admission server define the admission processing and specifically can define how the stored resource values should be interpreted and used to determine whether admission should be allowed or not. They may furthermore define how the available resource value stored by the resource availability processor 211 should be modified when a new session is admitted.

For example, the admission criterion applied by the admission controller 207 may be specified by the processing rules. For example, the rules for an IEEE 802.16e or UMTS access network may specify that a session is to be admitted only if the estimated required resource is individually available for both the uplink and downlink. However, for an IEEE 802.11 access network, the processing rules may require that the single resource availability of the shared pool must be sufficient to allow the accumulated the estimated uplink and downlink resource requirement.

Figure 3:
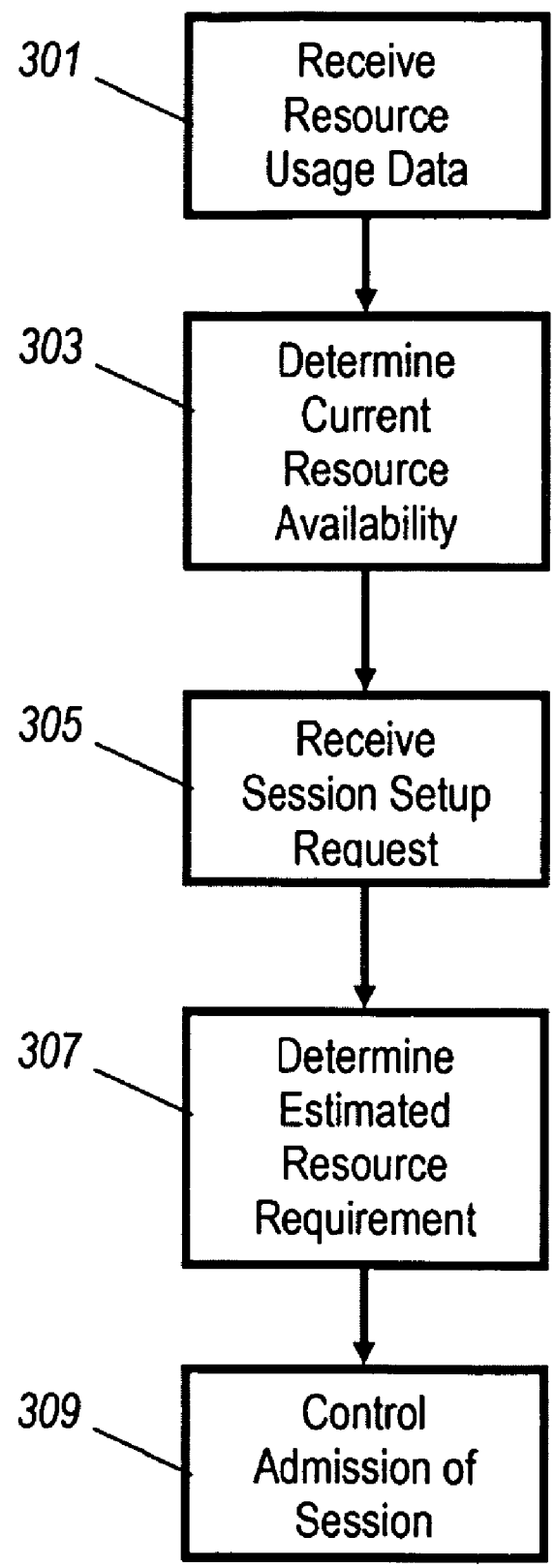
FIG. 3 illustrates an example of a method of admission control for a heterogeneous communication system in accordance with some embodiments of the invention.

FIG. 3 illustrates a method of admission control for a heterogeneous communication system which includes a plurality of heterogeneous access networks, a core network connecting the heterogeneous access networks, and an admission server being part of the core network.

The method initiates in step 301 wherein the admission server receives resource usage data from the heterogeneous access networks, the resource usage data comprising resource indications each of which is indicative of an estimated resource usage for a given communication service and a given access point of an access network of the heterogeneous access networks.

Step 301 is followed by step 303 wherein the admission server determines and stores current resource availability indications for access points of the heterogeneous access network.

Step 303 is followed by step 305 wherein the admission server receives at least a first communication session setup request for a user equipment seeking to set up a first communication session using the heterogeneous communication system. The first communication session setup request comprises a communication service indication for the first communication session and an access point identification identifying a first access point of a first of the heterogeneous access networks.

Step 305 is followed by step 307 wherein the admission server determines an estimated resource requirement for the first communication session in response to the resource indications, the communication service indication and the access point identification.

Step 307 is followed by step 309 wherein the admission server controls admission of the first communication session in response to a resource availability for the first access point and the estimated resource requirement.

It will be appreciated that in other embodiments, other orders or sequences of the described steps may be used. For example, step 301 may be executed independently of steps 303-309. E.g., step 301 may be executed infrequently (whenever an update is taking place) whereas steps 303,305,307, 309 may be executed for each session setup request.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A heterogeneous communication system comprising
a plurality of heterogeneous access networks;
a core network connecting the heterogeneous access networks; and
an admission server being part of the core network and comprising:
a network interface for receiving resource usage data from the heterogeneous access networks, the resource usage data comprising resource indications each of which is indicative of an estimated resource usage for a given communication service and a given access point of an access network of the heterogeneous access networks;

a resource availability processor for determining and storing current resource availability indications for access points of the heterogeneous access networks;

a communication session request processor for receiving at least a first communication session setup request for a user equipment seeking to set up a first communication session using the heterogeneous communication system, the first communication session setup request comprising a communication service indication for the first communication session and an access point identification identifying a first access point of a first of the heterogeneous access networks;

a resource requirement processor for determining an estimated resource requirement for the first communication session in response to the resource indications, the communication service indication and the access point identification; and an admission controller for controlling admission of the first communication session in response to a resource availability for the first access point and the estimated resource requirement.

2. The heterogeneous communication system of claim 1 wherein the resource indications have a common technology independent format for all of the heterogeneous access networks.

3. The heterogeneous communication system of claim 2 wherein the estimated resource usage for an access point and a communication service corresponds to an estimated fraction of a total resource availability of the access point required by the communication service.

4. The heterogeneous communication system of claim 1 wherein the stored current resource availability indications have a common technology independent format for all of the heterogeneous access networks.

5. The heterogeneous communication system of claim 1 wherein the resource availability processor is arranged to reduce a current resource availability indication for the first base station in response to the estimated resource requirement if admission is allowed for the first communication service.

6. The heterogeneous communication system of claim 1 wherein each of the heterogeneous access networks is designated as one of an access network resource controlled network wherein resource usage is controlled by the heterogeneous access network and a non-access network resource controlled network wherein resource usage is controlled by the user equipment, and wherein the admission server is arranged to process the resource usage data in response to a designation of access networks originating the resource usage data.

7. The heterogeneous communication system of claim 1 wherein each of the heterogeneous access networks is designated as one of a regulated network and a non-regulated network, and wherein the admission server is arranged to process the resource usage data in response to a designation of access networks originating the resource usage data.

8. The heterogeneous communication system of claim 1 wherein each of the heterogeneous access networks is designated as one of an access network resource controlled network wherein resource usage is controlled by the heterogeneous access network and a non-access network resource controlled network wherein resource usage is controlled by the user equipment, and wherein at least some network elements of access network resource controlled networks are arranged to generate resource indications in response to a monitoring of operational characteristics for the access points of the access network resource controlled network.

9. The heterogeneous communication system of claim 8 wherein at least some network elements of non-access network resource controlled networks are arranged to transmit resource indications to the admission server comprising static predetermined resource indications.

10. The heterogeneous communication system of claim 9 wherein the at least some network elements of non-access network resource controlled networks are arranged to transmit a dynamic resource correction value to the admission server, and the admission server is arranged to compensate a static predetermined resource indication in response to the dynamic resource correction value.

11. The heterogeneous communication system of claim 10 wherein the dynamic resource correction value for a first access point comprises an indication of an interference level experienced by the first access point.

12. The heterogeneous communication system of claim 11 wherein the interference level is for interference sources external to an access network comprising the first access point.

13. The heterogeneous communication system of claim 1 wherein the admission server further comprises storage for storing processing rules for different categories of access networks and wherein the admission server is arranged to adapt admission control for a first access network in response to procession rules for a category to which the first access network belongs.

14. The heterogeneous communication system of claim 1 wherein the estimated resource usage for at least some resource indications corresponds to an estimated average resource proportion of a total available access point resource.

15. The heterogeneous communication system of claim 1 wherein a source for resource indications includes one or more of:
an access point;
a base station;
an access router;
a base station controller; and
a radio network controller.

16. The heterogeneous communication system of claim 1 wherein the resource usage data comprises air interface resource data for an air interface of a wireless access network.

17. The heterogeneous communication system of claim 1 wherein each of the heterogeneous access networks is designated as one of an multi resource pool access network wherein resource allocation from multiple resource pools are independent and a single resource pool access network wherein resource allocation is from a single shared resource pool, and wherein the admission server is arranged to control admission in response to a designation of the first of the heterogeneous access networks.

18. The heterogeneous communication system of claim 17 wherein at least one of the multi resource pool access networks comprises separate uplink and downlink resource pools.

19. The heterogeneous communication system of claim 17 wherein the first of the heterogeneous access networks is a multi resource pool access network and the admission controller is arranged to allow admission of the first communication session only if each resource pool for the first of the heterogeneous access networks has an amount of available resource sufficient to support an estimated resource usage for the first communication session for each resource pool.

20. A method of admission control for a heterogeneous communication system including a plurality of heterogeneous access networks, a core network connecting the heterogeneous access networks, and an admission server being part of the core network, the method comprising the admission server performing the steps of:

receiving resource usage data from the heterogeneous access networks, the resource usage data comprising resource indications each of which is indicative of an estimated resource usage for a given communication service and a given access point of an access network of the heterogeneous access networks;

determining and storing current resource availability indications for access points of the heterogeneous access network;

receiving at least a first communication session setup request for a user equipment seeking to set up a first communication session using the heterogeneous communication system, the first communication session setup request comprising a communication service indication for the first communication session and an access point identification identifying a first access point of a first of the heterogeneous access networks;

determining an estimated resource requirement for the first communication session in response to the resource indications, the communication service indication and the access point identification; and controlling admission of the first communication session in response to a resource availability for the first access point and the estimated resource requirement.

* * * * *